W. WEBSTER.
MACHINE FOR MANUFACTURING FEATHERBONE BLADE.
APPLICATION FILED OCT. 31, 1906.
982,323.
Patented Jan. 24, 1911.
3 SHEETS—SHEET 3.
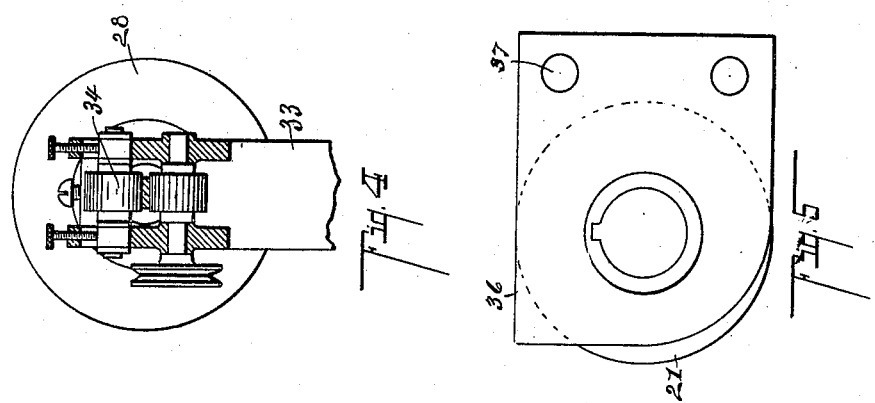
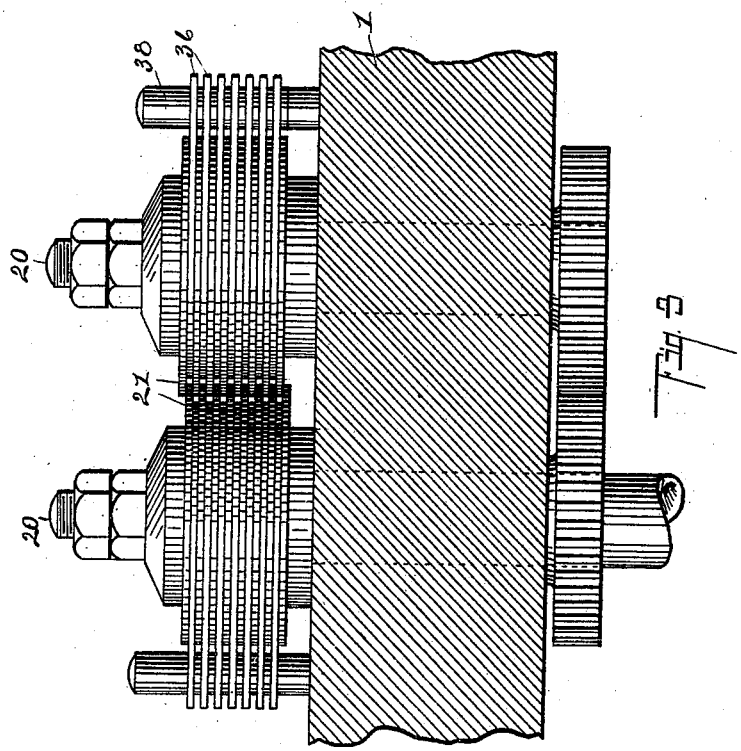
Witnesses:
Inventor,
William Webster
By Chappell & Earl
Att'ys

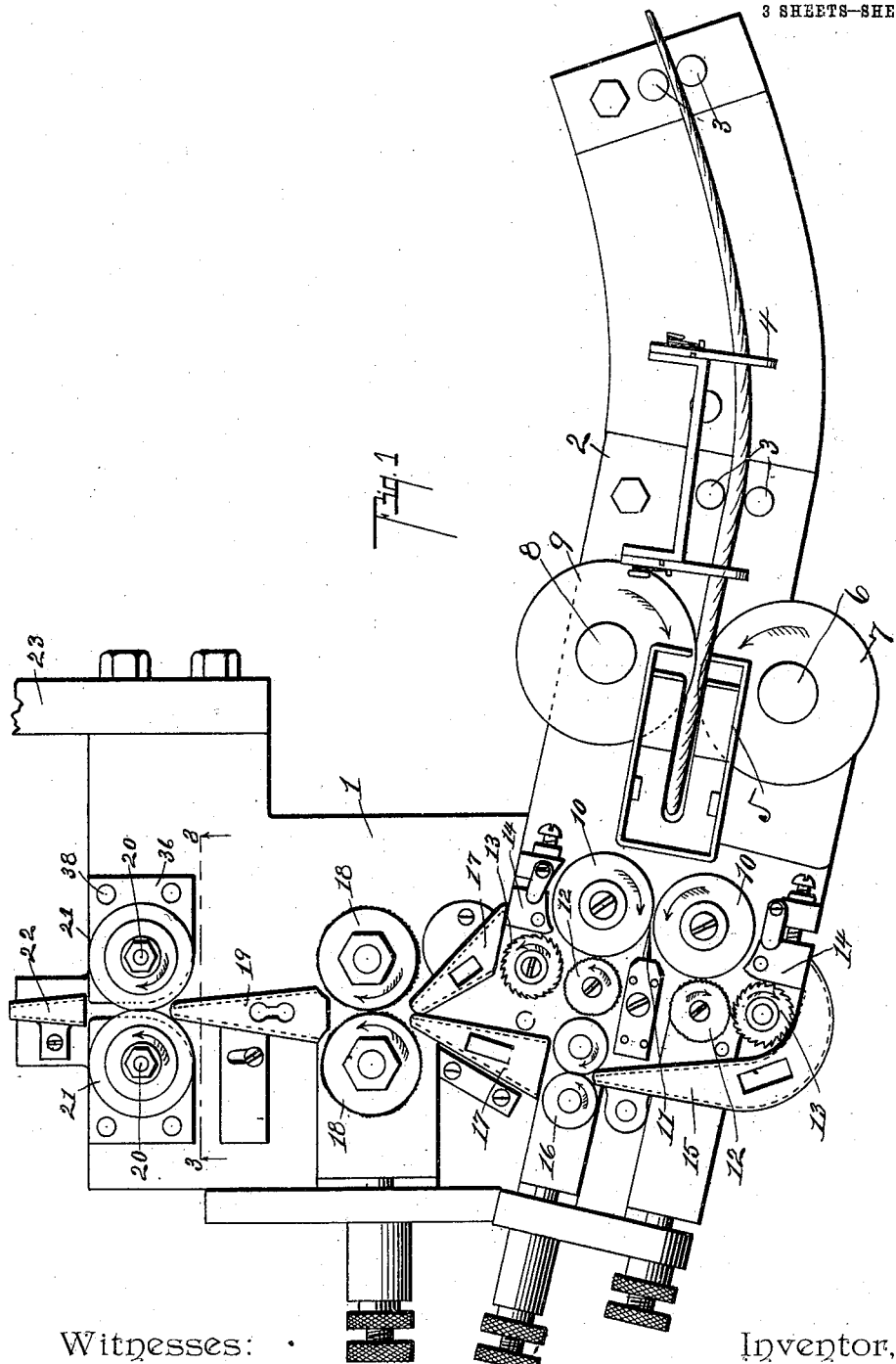

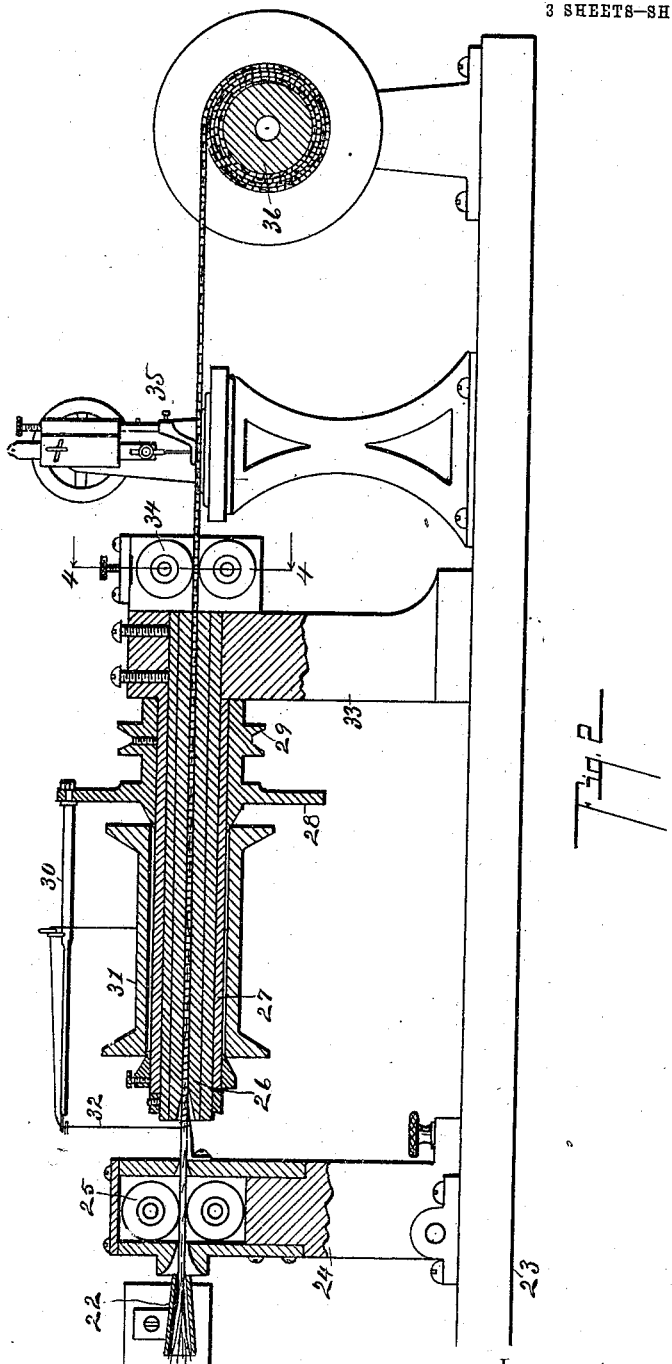

UNITED STATES PATENT OFFICE.

WILLIAM WEBSTER, OF LONDON, ONTARIO, CANADA, ASSIGNOR, BY MESNE ASSIGNMENTS, TO WARREN FEATHERBONE COMPANY OF MICHIGAN, OF THREE OAKS, MICHIGAN, A CORPORATION OF MICHIGAN.

MACHINE FOR MANUFACTURING FEATHERBONE BLADE.

982,323. Specification of Letters Patent. Patented Jan. 24, 1911.

Application filed October 31, 1906. Serial No. 341,504.

*To all whom it may concern:*

Be it known that I, WILLIAM WEBSTER, a subject of the King of Great Britain, residing at the city of London, Province of Ontario, Dominion of Canada, have invented certain new and useful Improvements in Machines for Manufacturing Featherbone Blade, of which the following is a specification.

This invention relates to an improved machine for manufacturing featherbone blade automatically from quills, it being merely necessary to feed the quills into the machine when the completed blade will be delivered.

This invention is related to the invention of my U. S. Patent No. 836,821, of Nov. 20, 1906.

Heretofore in the manufacture of blade, the quill has first been fibered and the fiber has either been made directly into the blade or else made into cords which are assembled into a blade, but the particular mechanism here illustrated makes it possible to take the complete quill, deliver it to the machine and receive therefrom a complete featherbone blade.

The objects, both in general and as to details, will definitely appear from the specification.

The invention is clearly defined and pointed out in the claims.

A structure embodying the features of my invention is clearly illustrated in the accompanying drawing, forming a part of this specification, in which, Figure 1 is a detail view of the first part of the machine including the splitting, pithing and fibering mechanism. Fig. 2 is a detail horizontal sectional view of the part of the machine which takes the fiber and forms it into a blade, showing the method of delivery of the fiber from the first part of the machine to the second part. Fig. 3 is an enlarged detail sectional view of the fibering disks taken on a line corresponding to line 3—3 of Fig. 1. Fig. 4 is an enlarged detail sectional view taken on a line corresponding to line 4—4 of Fig. 2. Fig. 5 is a detail plan view of one of the cutter disks 21 and the intervening guide plate 36, showing the method of driving the cutter disks and the method of guiding the fiber therefrom.

In the drawing, all of the sectional views are taken looking in the direction of the little arrows at the ends of the section lines, and similar numbers of reference refer to similar parts throughout the several views.

Referring to the numbered parts of the drawing, the parts of my improved mechanism are supported on a bed or base plate 1. They consist of a quill feeding device, being a pair of rolls 7 and 9 which embrace the quills and drive them forward. These rolls are supported on the vertical shafts 6 and 8 respectively which are driven by suitable means not here illustrated. The quills are placed in a stack between upright pins 3 and 3, which are on the auxiliary plate 2. The quills are delivered by the feed rolls 7 and 9 to a pair of feed rolls 10—10, which deliver them against a splitting knife 11. This splitting knife 11 divides the quills into halves, delivering one half to one side and the other half to the opposite side where they are embraced by corrugated or knurled rolls 12—12 and delivered into proximity to rotary pithing cutters 13—13. These pithing cutters cut off the pith from the halves of the quills, when one half is delivered directly to the righthand guide chute 17 and the other half is delivered through the elongated curved guide 15 and thence it is seized by a pair of feed rolls 16 and delivered to the lefthand guide 17. The longer course of this portion of the quill causes the same to lap on the half that was delivered directly so that the joint is broken when the strips are delivered between the feed rolls 18—18. Thence they are passed through the guide 19 to fibering means, which consist of two stacks of fiber disks; see Fig. 3. These fiber disks intermesh with each other and are separated by separating and guiding plates 36. The plates 36 are secured against rotation by a pair of pins 38 through perforations 37 in their projecting outer sides. These guiding plates project back of the cutting disks and guide the mass of fiber straight back in a single large bundle.

The disks are rotated by means of a suitable key in the vertical shafts 20—20, and they fiber the quill strips and grasp the same and drive the fiber forward through the throat 22, the fiber being carried from between the slitting disks by the projecting corners of the plates 36, the guiding edges of which are arranged parallel to each other, as clearly appears in Fig. 1. The fiber is thus delivered to the throat 22 and passes thence between a pair of feed rolls 25 delivering the same through a throat of a definite width. It is then passed out over a flat plate to the throat of a winder, which is of the form of the blade which it is desired to produce. This winder mechanism and parts are substantially of the form of that appearing in the United States patent to Edward K. Warren, No. 789,826 issued May 16, 1905.

A flier is provided which carries a spool of thread 31 and is revolved on the sleeve 27 by means of the grooved pulley 29, a part 28 being provided to counterbalance the arm 30 and the threaded guide 32. The central core 26 through which the blade is delivered is retained in fixed position. The wound flat blade is delivered out between a pair of rolls 34, and, while it is thus retained in a flat position, a row or rows of stitches is put through the center thereof by the sewing machine 35 and the completed blade is wound up on the reel 36. This winder and sewing machine mechanism is secured to the side of the base plate 1 so that the needle of the sewing machine reciprocates in a horizontal position instead of in a vertical position. This is necessary in the particular arrangement here shown.

Having thus described my invention, what I claim as new and desire to secure by Letters Patent is:

1. In a machine for making featherbone blade from quills, the combination of a suitable means for delivering the quills from a stack one at a time; a pair of rolls for advancing the quills; a splitting knife coöperating with the said rolls for splitting the quills; feed rolls for engaging the parts of the split quill; depithing cutters back of said rollers for cutting the pith from the parts of said quills; an elongated curved guide passage for one part of the quills and a direct straight shorter guide passage for the other part, with feed rolls for advancing the parts and delivering the same together; rolls for embracing the two parts of the quills together and advancing them forwardly; a fibering device consisting of stacks of intermeshing fibering disks, spacing and guide plates inserted between the disks for cleaning the same and delivering the fiber forwardly in a mass, rolls for engaging the fiber to advance it in a flat blade form and feed the same forward in such form; a suitable winder with a fixed core containing a rectangular throat for receiving the fibers automatically as formed, said winder wrapping a thread around the blade; rolls for delivering the blade from said winder; and a sewing machine for stitching through the said blade to retain the windings in position, co-acting for the purpose specified.

2. In a machine for making featherbone blade from quills, the combination of a suitable means for delivering the quills from a stack one at a time; a pair of rolls for advancing the quills; a splitting knife coöperating with the said rolls for splitting the quills; feed rolls for engaging the parts of the split quill; an elongated curved guide passage for one part of the quills and a direct straight shorter guide passage for the other part, with feed rolls for advancing the parts and delivering the same together; rolls for embracing the two parts of the quill together and advancing them forwardly; a fibering device consisting of stacks of intermeshing fibering disks, spacing and guide plates inserted between the disks for cleaning the same and delivering the fiber in a mass, rolls for engaging the fiber to advance it in a flat form and feed the same forward in such form; a suitable winder with a fixed core containing a rectangular throat for receiving the fibers automatically as formed, said winder wrapping a thread around the blade; rolls for delivering the blade from said winder; and a sewing machine for stitching through the said blade to retain the windings in position, co-acting for the purpose specified.

3. In a machine for making featherbone blade from quills, the combination of a pair of rolls for advancing the quills one at a time, successively; a splitting knife coöperating with the said rolls for splitting the quills; feed rolls for engaging the parts of the split quill; revolving depithing cutters back of the said rollers for cutting the pith from the parts of said quills; an elongated curved guide passage for one part of the quills and a direct straight shorter guide passage for the other part, with feed rolls for advancing the parts and delivering the same together; rolls for embracing the two overlapping parts of the quills together and advancing them forwardly; a fibering device consisting of stacks of intermeshing fibering disks, spacing and guide plates inserted between the disks for cleaning the same and delivering the fiber forward in a mass, rolls for engaging the fiber to advance it in a flat blade form and feed the same forward in such form; a suitable winder with a fixed core containing a rectangular throat for receiving the fibers automatically as formed, said winder wrapping a thread around the blade; rolls for delivering the blade from said winder; and a sewing machine for stitching through the said blade to retain the windings in position, co-acting for the purpose specified.

4. In a machine for making featherbone blade from quills, the combination of a pair of rolls for advancing the quills one at a time, successively; a splitting knife coöperating with the said rolls for splitting the quills; feed rolls for engaging the parts of the split quill; an elongated curved guide passage for one part of the quills and a direct straight shorter guide passage for the other part, with feed rolls for advancing the parts and delivering the same together; rolls for embracing the two overlapping parts of the quills together and advancing them forwardly; a fibering device consisting of stacks of intermeshing fibering disks, spacing and guide plates inserted between the disks for cleaning the same and delivering the fiber forward in a mass, rolls for engaging the fiber to advance it in a flat blade form and feed the same forward in such form; a suitable winder with a fixed core containing a rectangular throat for receiving the fibers automatically as formed, said winder wrapping a thread around the blade; rolls for delivering the blade from said winder; and a sewing machine for stitching through the said blade to retain the windings in position, co-acting for the purpose specified.

5. In a machine for making featherbone blade from quills, the combination of a pair of rolls for advancing the quills one at a time successively; a splitting knife coöperating with the said rolls for splitting the quills; means for depithing the parts of the split quill; guide passages for each of the parts, one of which is curved and longer than the other, delivering the two parts at the same point whereby they will come in overlapping relation; a fibering device for engaging and fibering the overlapping quill parts; guides for delivering the same in a blade form and feed the same forward in such form; a winder for wrapping thread around the blade arranged to receive such fiber automatically; and a sewing machine to stitch longitudinally through the blade to retain the wrapping threads in position thereon, co-acting for the purpose specified.

6. In a machine for making featherbone blade from quills, the combination of a pair of rolls for advancing the quills one at a time successively; a splitting knife coöperating with the said rolls for splitting the quills; guide passages for each of the parts, one of which is curved and longer than the other, delivering the two parts at the same point whereby they will come in overlapping relation; a fibering device for engaging and fibering the overlapping quill parts; guides for delivering the same in a blade form and feed the same forward in such form; a winder for wrapping thread around the blade arranged to receive such fiber automatically; and a sewing machine to stitch longitudinally through the blade to retain the wrapping threads in position thereon, co-acting for the purpose specified.

7. In a machine for making featherbone blade from quills, the combination of means for advancing the quills successively; a splitting knife for splitting the same; means for depithing the parts of the quill; guides and means for delivering the parts in overlapping relation; a fibering device for fibering the overlapped quill parts; means for supporting the same in blade form and feed the same forward in such form; and a winder for wrapping thread around the blade arranged to receive such fiber automatically; and a sewing machine arranged to stitch longitudinally through the blade to retain the wrapping thread in position thereon, for the purpose specified.

8. In a machine for making featherbone blade from quills, the combination of means for advancing the quills successively; a splitting knife for splitting the same; guides and means for delivering the parts in overlapping relation; a fibering device for fibering the overlapped quill parts; means for supporting the same in blade form and feed the same forward in such form; a winder for wrapping thread around the blade arranged to receive such fiber automatically; and a sewing machine arranged to stitch longitudinally through the blade to retain the wrapping thread in position thereon, for the purpose specified.

9. In a machine for making featherbone blade from quills, the combination of means for advancing the quills successively; a splitting knife for splitting the same; means for depithing the parts of the quill; guides and means for delivering the parts in overlapping relation; a fibering device for fibering the overlapped quill parts; means for supporting the same in blade form and feed the same forward in such form; and a winder for wrapping thread around the blade arranged to receive such fiber automatically, for the purpose specified.

10. In a machine for making featherbone blade from quills, the combination of means for advancing the quills successively; a splitting knife for splitting the same; guides and means for delivering the parts in overlapping relation; a fibering device for fibering the overlapped quill parts; means for supporting the same in blade form and feed the same forward in such form; and a winder for wrapping thread around the blade arranged to receive such fiber automatically, for the purpose specified.

11. In a machine for making featherbone blade from quills, the combination of a device for fibering the quills; means for delivering the mass of fibers in blade form and feed the same forward in such form; a winder for wrapping the thread around the same arranged to receive such fiber automatically; and a sewing machine arranged to stitch longitudinally through the blade to retain the wrapping thread in position, for the purpose specified.

12. In a machine for making featherbone blade from quills, the combination of a device for fibering the quills; means for delivering the mass of fibers in blade form and feed the same forward in such form; and a winder for wrapping the thread around the same arranged to receive such fiber automatically, for the purpose specified.

In witness whereof, I have hereunto set my hand and seal in the presence of two witnesses.

WILLIAM WEBSTER. [L. S.]

Witnesses:
 R. G. FISHER,
 D. CONSTABLE.